(12) United States Patent
Beals et al.

(10) Patent No.: US 7,009,363 B2
(45) Date of Patent: Mar. 7, 2006

(54) OPTIMIZED BATTERY LIFE IN MULTIPLE BATTERY APPLICATIONS

(75) Inventors: Richard A. Beals, Houston, TX (US); David Long, Houston, TX (US)

(73) Assignee: PathFinder Energy Services, Inc., Houston, TX (US)

(*) Notice: Subject to any disclaimer, the term of this patent is extended or adjusted under 35 U.S.C. 154(b) by 275 days.

(21) Appl. No.: 10/397,911

(22) Filed: Mar. 26, 2003

(65) Prior Publication Data

US 2004/0189249 A1 Sep. 30, 2004

(51) Int. Cl.
*H02J 7/00* (2006.01)

(52) U.S. Cl. .................... 320/117; 320/132; 307/66

(58) Field of Classification Search ............... 320/117, 320/126, 121, 132, 165; 307/39, 43, 52, 66, 307/87

See application file for complete search history.

(56) References Cited

U.S. PATENT DOCUMENTS

| | | | |
|---|---|---|---|
| 3,767,933 A | 10/1973 | Bogue et al. ............... 307/48 |
| 5,270,946 A | 12/1993 | Shibasaki et al. ........... 713/340 |
| 5,307,004 A * | 4/1994 | Carsten ...................... 323/222 |
| 5,477,123 A | 12/1995 | Allen et al. ................. 320/116 |
| 5,519,261 A * | 5/1996 | Stewart ....................... 307/87 |
| 5,621,301 A | 4/1997 | Allen et al. ................. 320/124 |
| 5,640,078 A | 6/1997 | Kou et al. .................. 320/124 |
| 5,684,384 A | 11/1997 | Barkat et al. ................ 307/66 |
| 5,764,032 A | 6/1998 | Moore ......................... 320/126 |
| 5,821,734 A | 10/1998 | Faulk ......................... 320/124 |
| 6,078,165 A | 6/2000 | Ashtiani et al. ............ 320/116 |
| 6,081,096 A | 6/2000 | Barkat et al. ............... 320/124 |
| 6,172,479 B1 | 1/2001 | Barton ........................ 320/121 |
| 6,194,793 B1 * | 2/2001 | Fisher, Jr. ..................... 307/66 |
| 6,268,711 B1 | 7/2001 | Bearfield ..................... 320/117 |
| 6,437,538 B1 | 8/2002 | Tsurumi et al. ............. 320/116 |
| 6,469,471 B1 | 10/2002 | Anbuky et al. ............. 348/441 |
| 6,492,745 B1 | 12/2002 | Colley, III et al. .......... 307/66 |
| 6,493,243 B1 | 12/2002 | Real ............................ 363/17 |
| 6,507,129 B1 | 1/2003 | Buchanan .................... 307/51 |
| 6,515,872 B1 | 2/2003 | Nakayama et al. .......... 363/17 |
| 6,525,434 B1 | 2/2003 | Brodeur ....................... 307/39 |
| 6,531,791 B1 | 3/2003 | Ekelund et al. .............. 301/66 |
| 6,566,846 B1 | 5/2003 | Voo ............................ 323/267 |
| 6,583,523 B1 | 6/2003 | Bhate .......................... 307/86 |
| 6,597,156 B1 | 7/2003 | Gogolla ...................... 323/224 |
| 6,600,239 B1 | 7/2003 | Winick et al. ............... 307/85 |
| 6,614,133 B1 | 9/2003 | Belson et al. ................ 307/58 |
| 6,624,613 B1 | 9/2003 | Kitagawa .................... 320/124 |
| 6,639,383 B1 | 10/2003 | Nelson et al. .............. 320/116 |
| 6,653,748 B1 | 11/2003 | Buchanan .................... 307/51 |
| 6,657,319 B1 | 12/2003 | Sanada ........................ 307/45 |
| 6,665,198 B1 | 12/2003 | Tasi et al. .................... 363/39 |

\* cited by examiner

Primary Examiner—Rajnikant B. Patel

(57) ABSTRACT

Various apparatus and methods of supplying regulated battery power to an electrical device, such as a downhole tool, are provided. In one aspect, a method of providing power to an electrical device is provided that includes providing a plurality of batteries and providing a plurality of controllable regulators for regulating the power output of the plurality of batteries. The plurality of controllable regulators is set so that power is drawn from a minimum number of the plurality of batteries necessary to satisfy demand from the electrical device. The electrical device is enabled to periodically draw power from and thereby depassivate each of the plurality of batteries.

23 Claims, 3 Drawing Sheets

OPTIMIZED BATTERY LIFE IN MULTIPLE BATTERY APPLICATIONS

FIELD OF THE INVENTION

This invention relates generally to battery power systems, and more particularly to methods and apparatus for supplying battery power with optimized discharging.

BACKGROUND OF THE INVENTION

Batteries are used in downhole applications to provide power to equipment, such as logging instruments, which gather and relay information to the surface regarding conditions below. A typical conventional battery usually consists of multiple cells connected in series to form a battery or "stick." Cells are used cumulatively in the battery to provide the desired output voltage. Depending upon the power requirements and available internal spaces of the downhole tool, multiple batteries are sometimes used.

However, conventional battery deployments have several operating disadvantages. For example, the current drawn from batteries may exceed the battery's design current density (amps per unit area of electrode) limit. In some batteries, such as lithium batteries, exceeding the rated current density results in an irreversible reaction, which causes the loss of some electrode material. Under these conditions, the amp-hour capacity of the battery drops from its design value, and total battery life decreases accordingly.

One conventional method to attempt to avoid such disadvantages is to deploy multiple sticks in parallel with diode isolation. While this multiple stick arrangement reduces the current demand on each stick, there remains another set of disadvantages. In this configuration, the batteries discharge at the same time, and substantially the same rate, even when a single battery could provide sufficient current to the equipment. Thus, the parallel-connected batteries' amp-hour capacity degrades simultaneously.

This operating mode is also known to result in unnecessary waste and costs of battery disposal. Due to the costs involved with retrieving tools from downhole in order to change batteries, it is often not economically viable to re-use partially discharged batteries below a certain charge level. For example, two batteries wired in parallel may each be discharged by sixty percent, which in some conditions may render them both insufficient for re-use later. Disposal of both would then be required, wasting the unused forty percent of each battery's remaining rated life.

Another troublesome property of lithium batteries is the phenomena of battery electrode passivation wherein the battery output impedance rises and makes available battery power fall.

The present invention is directed to overcoming or reducing the effects of one or more of the foregoing disadvantages.

SUMMARY OF THE INVENTION

In accordance with one aspect of the present invention, a device for powering a load is provided that includes a first battery, a second battery, a first controllable regulator that has an input coupled to the first battery and an output for coupling to the load and a second controllable regulator. The second controllable regulator has an input coupled to the second battery and an output for coupling to the load in parallel with the output of the first controllable regulator. The second controllable regulator is operable to enable the load to draw power from the second battery when an output voltage of the first regulator falls below a voltage set point. The first and second controllable regulators are operable to enable the load to alternately draw power from either of the first and second batteries even if the output voltage of the first controllable regulator does not fall below the voltage setpoint wherein the first and the second batteries are periodically depassivated.

In accordance with another aspect of the present invention, a downhole tool is provided that includes an electrical unit requiring electrical power and power unit for supplying electrical power to the electrical unit. The power unit has a first battery, a second battery, a first controllable regulator that has an input coupled to the first battery and an output coupled to the electrical unit. A second controllable regulator is provided that includes an input coupled to the first battery and an output coupled to the electrical unit in parallel with the output of the first controllable regulator. The second controllable regulator is operable to enable the electrical unit to draw power from the second battery when an output voltage of the first controllable regulator falls below a voltage setpoint.

In accordance with another aspect of the present invention, a downhole tool is provided that includes an electrical unit requiring electrical power and a power unit for supplying electrical power to the electrical unit. The power unit has a plurality of batteries and a plurality of controllable regulators. The plurality of controllable regulators is operable to enable the electrical unit to draw power from a minimum number of the plurality of batteries necessary to satisfy a demand from the electrical unit so that the batteries are preferentially discharged. A controller is provided for controlling the plurality of controllable regulators.

In accordance with another aspect of the present invention, a method of providing power to an electrical device is provided that includes providing a plurality of batteries and providing a plurality of controllable regulators for regulating the power output of the plurality of batteries. The plurality of controllable regulators is set so that power is drawn from a minimum number of the plurality of batteries necessary to satisfy demand from the electrical device. The electrical device is enabled to periodically draw power from and thereby depassivate each of the plurality of batteries.

In accordance with another aspect of the present invention, a method of providing power to an electrical device is provided that includes providing first, second, third and fourth batteries, and first, second, third and fourth controllable regulators that have outputs in parallel for regulating corresponding power outputs of the first, second, third and fourth batteries. A first no-load output voltage is set for the first controllable regulator, a second no-load output voltage lower than the first no-load output voltage is set for the second controllable regulator, a third no-load output voltage lower than the second no-load output voltage is set for the third controllable regulator and a fourth no-load output voltage lower than the third no-load output voltage is set for the fourth controllable regulator. The second controllable regulator will enable the electrical device to draw power from the second battery when an output voltage of the first controllable regulator falls to the second no-load output voltage, the third controllable regulator will enable the electrical device to draw power from the third battery when an output voltage of the second controllable regulator falls to the third no-load output voltage, and the fourth controllable regulator will enable the electrical device to draw power from the fourth battery when an output voltage of the third controllable regulator falls to the fourth no-load output voltage.

In accordance with another aspect of the present invention, a device for powering a load is provided. The device includes a first battery, a second battery, and a first controllable regulator that has an input coupled to the first battery and an output. A first switch is coupled to the output of the first controllable regulator for selectively coupling the first controllable regulator to the load. A second controllable regulator is provided that has an input coupled to the second battery and an output. A second switch is coupled to the output of the second controllable regulator for selectively coupling the output of the second controllable regulator to the load in parallel with the first controllable regulator. The first and second switches are operable to selectively enable the load to draw power from the second battery when an output voltage of the first regulator falls below a voltage set point. The first and second switches are operable to enable the load to alternately draw power from either of the first and second batteries even if the output voltage of the first controllable regulator does not fall below the voltage set point. The first and second batteries are periodically depassivated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be also be realize by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
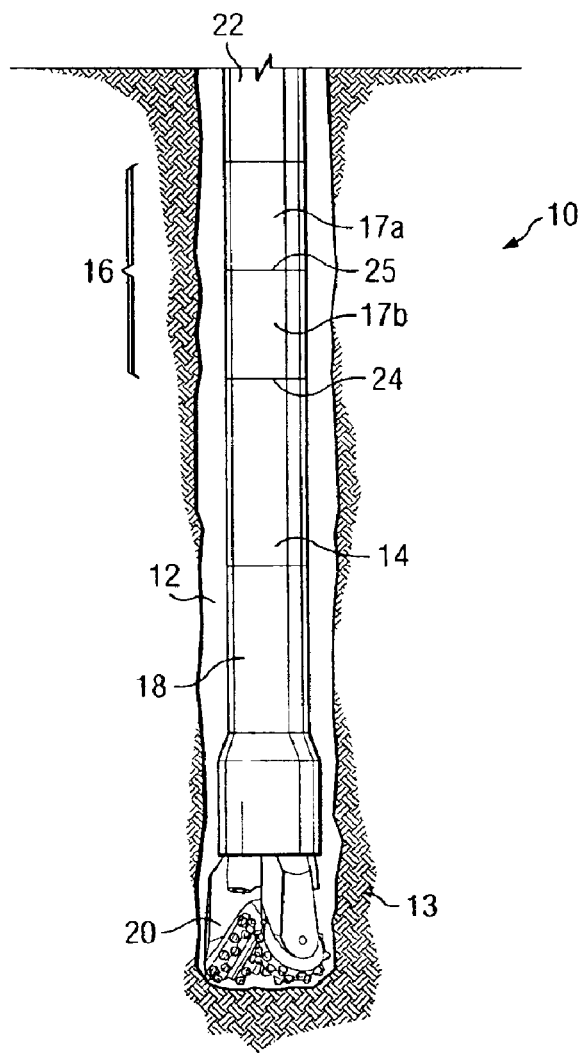
FIG. 1 is a schematic side view of an exemplary embodiment of a downhole tool provided with a battery power unit in accordance with the present invention.

In the drawings described below, reference numerals are generally repeated where identical elements appear in more than one figure. Turning now to the drawings, and in particular to FIG. 1, therein is shown a schematic side view of an exemplary embodiment of a downhole tool 10 positioned in a bore hole 12 that penetrates a subterranean formation 13. The downhole tool 10 includes an electrical unit or load 14 that is supplied with electrical power by a power unit 16. The power unit 16 may be subdivided into a housing 17a for containing batteries a housing 17b for containing battery power control circuitry that is disconnectable from the housing 17a. Optionally, the housings 17a and 17b may be unitary. The downhole tool 10 may be optionally provided with a sub 18 and a drill bit 20 in the event that the downhole tool 10 is used during drilling operations. The sub 18 may be any downhole tool, sub or sonde used in the downhole environment, such as a mud motor, sensor package, or shock absorber. The tool 10 is suspended in the bore hole 12 by way of a drill string 22 that may comprise a plurality of interconnected pipe sections, or alternatively may be a length of coil tubing, or a wireline or slickline.

In the embodiment illustrated in FIG. 1, the electrical unit 14 and the power unit 16 are modular units that are interconnected at the joint 24, and the housings 17a and 17b are similarly interconnected at the joint 25. However, the skilled artisan will appreciate that the components of the power unit 16 and the electrical unit 14 to be described in more detail elsewhere herein may be positioned in a single sub or multiple subs as desired. If configured in a modular fashion, the power unit 16 and the electrical unit 14 may be joined together using a myriad of well-known fastening techniques, such as, for example, threaded pipe connections, bolting, welding or other well-known techniques.

The electrical unit or load 14 may include one or more sensors for sensing conditions of the tool 10, the borehole 12, the formation 13 or combinations of these. Examples of the types of sensors are legion, and include, for example, resistivity sensors, gamma sensors, neutron decay sensors, motion sensors, azimuth sensors, or inclination sensors, to name just a few. Optionally, the electrical unit 14 may include other types of electrical devices that require electrical power.

Figure 2:
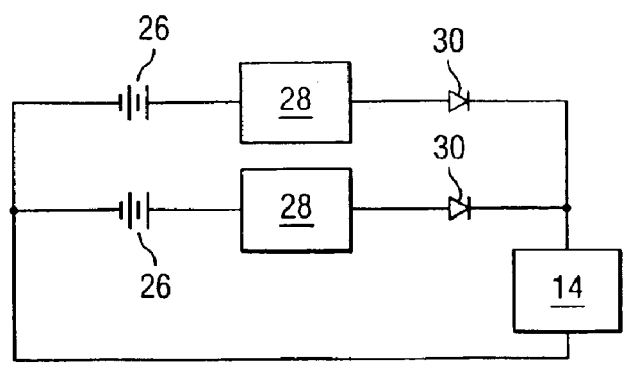
FIG. 2 is a schematic view of a prior art multiple-battery power unit.

It is necessary to supply electrical power to the electrical unit 14. If conventional techniques were used to power the electrical unit 14, an arrangement as shown in FIG. 2 might be used. As the schematic view illustrates, multiple batteries 26 are connected to electronic switches 28. The outputs of the electronic switches are connected to protective diodes 30. The outputs of the diodes 30 are connected in parallel and provided to the electrical unit 14. The electronic switches 12 serve to turn the supply from each battery 26 on or off, but do not provide voltage or current regulation and do not prevent both batteries 26 (if both electronic switches 12 are on) from draining simultaneously, even if one battery 26 could supply sufficient current at the time. This can lead to the unnecessary waste of partially depleted batteries at the time of tool maintenance as described elsewhere herein.

Figure 3:
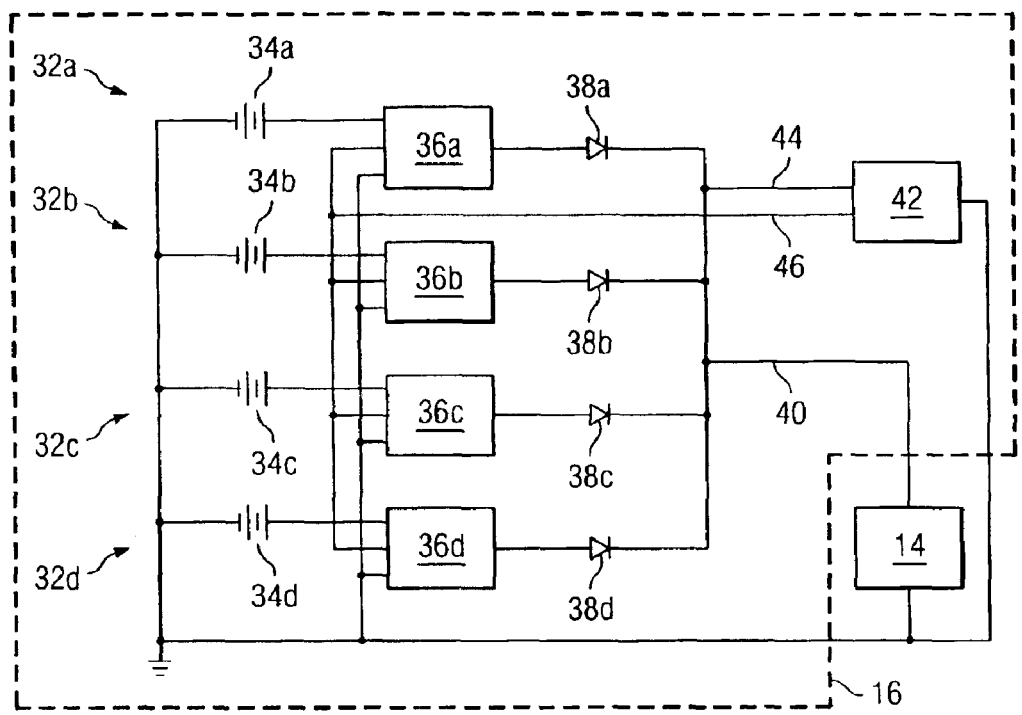
FIG. 3 is a schematic view of an exemplary embodiment of a multiple-battery power unit in accordance with the present invention.

An exemplary embodiment of the power unit 16 in accordance with the present invention may be understood by referring to FIG. 3, which is a schematic view that also depicts the electrical unit 14. The power unit 16 eliminates one or more of the disadvantages associated with conventional battery supply systems. Four battery circuits 32a, 32b, 32c and 32d are provided to power the electrical unit 14. The battery circuits 32a, 32b, 32c and 32d include respective batteries 34a, 34b, 34c, and 34d, regulators 36a, 36b, 36c and 36d and protective diodes 38a, 38b, 38c and 38d. The outputs of the diodes 38a, 38b, 38c and 38d are tied in parallel to the load or electrical unit 14 via conductor 40 and to a controller 42 via a conductor 44. Two-way communication between the controller 42 and the regulators 36a, 36b, 36c and 36d is provided by a communications channel 46, which may be a conductor bus or other type communications channel.

The regulators 36a, 36b, 36c and 36d serve the dual functions of regulating the output voltage supplied by and limiting the peak current drawn from their corresponding batteries 34a, 34b, 34c and 34d. In this way, potentially electrode damaging currents may be avoided. In the embodiment, the power unit 16 includes four battery circuits 32a, 32b, 32c and 32d. However, the skilled artisan will appreciate that the benefits of the present invention may be realized using two or more batteries.

The regulators 36a, 36b, 36c and 36d are controlled by the controller 42, which may be programmed to perform a variety of tasks. For example, the controller 42 may be configured to set output voltage settings for each of the regulators 36a, 36b, 36c and 36d and determine when the settings for the regulators 36a, 36b, 36c and 36d should be changed. The controller 42 may also be instructed to monitor the output voltage of and current drawn from each of the regulators each of the regulators 36a, 36b, 36c and 36d.

The controller 42 may be implemented in a myriad of ways, such as, for example, as a microprocessor, a logic array, a gate array, an application-specific integrated circuit, software executable on a general purpose processor computer, combinations of these or the like. Indeed, the functions of the controller 42 and the regulators 36a, 36b, 36c and 36d might be integrated into a single device. In an exemplary embodiment, the controller 42 is implemented as a microprocessor.

In operation, the controller 42 sets voltage setpoints for the regulators 36a, 36b, 36c and 36d so that the demand of the load 14 may be met by a minimum number of batteries 34a, 34b, 34c and 34d. The controller 42 accomplishes this by setting the no-load output voltages of the regulators 36a, 36b, 36c and 36d. In this regard, the controller 42 sets the no-load output voltage of one of the regulators, say regulator 36a for the sake of discussion, to be the system voltage typically required by the load 14. This highest of the no-load output voltages of the regulators 36a, 36b, 36c and 36d is advantageously set to be about twice the output voltage of the battery 34a coupled to the regulator 36a. If the output voltage is twice the battery voltage, the rise and fall times of the wave form for the battery current will be the same, resulting in a minimization of dV/dt noise. This, of course, implies that the regulator 36a functions as a step-up regulator. However, well-known step-down regulators may also be used. With the regulator 36a configured as the high-set regulator, the controller 42 sets the no-load output voltages of the remaining regulators 36b, 36c and 36d so that their respective output voltages are at staggered levels lower than the no-load output voltage setting for the regulator 36a. In this way, the power from these remaining batteries 36b, 36c and 36d (that are not "on line") is drawn down selectively and is thus reserved for future use. Optionally, the no-load output voltages of the remaining regulators 36b, 36c and 36d need not all be staggered.

Assume for the purposes of discussion that the desired voltage for the load 14 is 28.0 volts. If four batteries 34a, 34b, 34c and 34d with design currents of 300 mA are deployed, the four regulators 36a, 36b, 36c and 36d could be initially set by the microprocessor to 28.0 volts, 27.5 volts, 27.0 volts and 26.5 volts respectively. The regulators 36a, 36b, 36c and 36d may be programmed or otherwise configured with a drooping voltage characteristic that is linear or non-linear based on the battery current. One example would be a drooping characteristic of 1.667 volts per amp. Assume also that the load 14 is initially drawing 200 mA. In this state, the current drawn by the load 14 is less than the design current for the battery 34a, and the voltage at the output of the diode 38a may be about 28.0 volts, or perhaps something less than 28.0 volts but greater than 27.5 volts if drooping is implemented. All of the regulators 36b, 36c and 36d are operating and connected to the load 14. However, the respective 27.5 volts, 27.0 volts and 26.5 volts no-load outputs of the regulators 36b, 36c and 36d will not be sufficient to cause the diodes 38b, 38c and 38d to conduct. Thus, only the battery 34a regulated to an output of 28.0 volts will supply current.

Now assume that the load 14 begins to draw a current of 450 mA. In this state, output voltage of the diode 38a will droop to 27.5 volts, or somewhat less than 27.5 volts depending on the droop, if any, of the regulator 36b. When the output voltage of the diode 38a drops to 27.5 volts, two things occur. First, when the current drawn from the battery 34a reaches 300 mA, the regulator 36a changes operation to a current source. Second, the diode 38b begins to conduct and current is drawn from the battery 34b and delivered to the load 14. At this point, current is being supplied by the batteries 34a and 34b. If the load increases beyond, say 600 mA, then the battery 34c will come "on-line." If the current drawn by the, load 14 stays between 600 mA, then the batteries 34a, 34b and 34c will supply the current, but the battery 34d will remain off-line. However, if the load current goes to 1000 mA, then the voltage at the output of the diodes 38a, 38b, 38c and 38d will drop to 26.5 volts, the diode 38d will conduct and the battery 38d will come on-line.

The opposite will occur if the load decreases down from say 1000 mA. As the load decreases, one or more the batteries 34b, 34c and 34d may go "off line." In this way, the batteries 34a, 34b, 34c and 34d are preferentially discharged and protected against current overload that might cause internal electrode damage. Thus, in accordance with the present invention, one regulator, such as 36a is configured as the high-set regulator and another, such as 36b, is configured to enable the load 14 to draw power from its corresponding battery 32b upon an event. In the illustrated embodiment, the event is the output of the high-set regulator 36a and any of the other regulators 36c and 36d falling to or below the no-load output voltage of the regulator 36b.

The skilled artisan will appreciate that these numeric examples are illustrative. The voltage set points and current limits selected for the regulators 36a, 36b, 36c and 36d, as well as the battery design currents are largely matters of design discretion.

The management of batteries nearing depletion may be handled in a number of ways. For example, the controller 42 may be programmed to detect the depletion of a battery, say the battery 36a. At this point the controller 42 may adjust the no-load output voltage settings for the regulators 36b, 36c and 36d controlling the remaining batteries 34b, 34c and 34d to compensate. For example, the controller 42 may "stairstep" up the remaining regulators 36b, 36c and 36d to 28.0 volts, 27.5 volts and 27.0 volts respectively. The remaining batteries 34b, 34c and 34d would come on and off-line in the manner described elsewhere herein, albeit with fewer total batteries and a lower total current capacity.

The management of the depletion of batteries when there are only two undepleted batteries remaining may be handled in a slightly different fashion. Still referring to FIG. 3, assume that batteries 34a and 34b have been depleted and batteries 34c and 34d remain, each with about 100% remaining amp-hour capacity. If the controller 42 resets the no-load set points of the regulators 36c and 36d to 28.0 volts and 27.5 volts respectively, then the batteries 34c and 34d will come on-line and off-line as described above, albeit with a total capacity of 600 mA, and the battery 34c will be preferentially discharged in favor of the battery 34d. If the current drawn by the load 14 never exceeds 300 mA, then the battery 34c will be drained to exhaustion and the battery 34d will remain near 100% capacity. This power consumption history will suffice if the current drawn by the load 14 never exceeds 300 mA. However, if the load current ever exceeds 3.00 mA after the battery 34c has been exhausted, then the remaining battery 34d may be unable to supply the load. If this occurs in the downhole environment, then the tool 10 (see FIG. 1) will have to be pulled and provided with a fresh set of cells.

To improve the end-of-life management of the remaining batteries 34c and 34d in accordance with the present invention, the high and low no-load output voltages of the regulators 36c and 36d may be intermittently swapped so that the batteries 34c and 34d alternately serve as the primary power cell for the load 14. For example, at the onset of the operation using only the remaining batteries 34c and 34d, the regulator 36c maybe set at 28.0 volts and the regulator 36d may be set at 27.5 volts. After thirty minutes of operation at these settings, the no-load output voltages may be switched, that is, the regulator 36c set to 27.5 volts and the regulator 36d set to 28.0 volts. In this way, the amp-hour capacities of the batteries 34c and 34d may be depleted at about the same rate. In this way, both batteries 34c and 34d will be available to pick up peak current loads, at least for some time period.

The concept of shifting the no-load output voltages of the regulators 36a, 36b, 36c and 36d may be taken a step further as a technique of providing continuous depassivation of all of the batteries 34a, 34b, 34c and 34d. This is desirable since there maybe long periods of operation during which the current drawn by the load 14 never becomes large enough to draw current from the batteries 34b, 34c and 34d. During these lulls, the internal electrodes of the batteries 34b, 34c and 34d may become passivated due to a buildup of a dielectric coating. The dielectric coating will generally dissipate when battery current increases. However, there may be a time lag in the dissipation of the coating which results in a dip in the output voltages of the batteries for some initial time period. During the period of voltage dip, the load 14 may not be adequately supplied.

Assume for the purpose of this illustration that the load current is a relatively constant 300 mA. This does not need to be the case, but it does simplify the description. The no-load output voltages of the regulators 36a, 36b, 36c and 36d may be cycled according to the following tables:

TABLE 1

@ Time $t_0$

| Regulator/Battery Combination | Regulator Output (volts) | Battery Current (mA) |
|---|---|---|
| 36a/34a | 28.0 | 300 |
| 36b/34b | 27.5 | 0 |
| 36c/34c | 27.0 | 0 |
| 36d/34d | 26.5 | 0 |

TABLE 2

@ Time $t_0$ + 30 minutes

| Regulator/Battery Combination | Regulator Output (volts) | Battery Current (mA)) |
|---|---|---|
| 36a/34a | 27.5 | 0 |
| 36b/34b | 28.0 | 300 |
| 36c/34c | 27.0 | 0 |
| 36d/34d | 26.5 | 0 |

TABLE 3

@ Time $t_0$ + 33 minutes

| Regulator/Battery Combination | Regulator Output (volts) | Battery Current (mA)) |
|---|---|---|
| 36a/34a | 28.0 | 300 |
| 36b/34b | 27.5 | 0 |
| 36c/34c | 27.0 | 0 |
| 36d/34d | 26.5 | 0 |

TABLE 4

@ Time $t_0$ + 63 minutes

| Regulator/Battery Combination | Regulator Output (volts) | Battery Current (mA)) |
|---|---|---|
| 36a/34a | 27.5 | 0 |
| 36b/34b | 27.0 | 0 |
| 36c/34c | 28.0 | 300 |
| 36d/34d | 26.5 | 0 |

TABLE 5

@ Time $t_0$ + 66 minutes

| Regulator/Battery Combination | Regulator Output (volts) | Battery Current (mA)) |
|---|---|---|
| 36a/34a | 28.0 | 300 |
| 36b/34b | 27.5 | 0 |
| 36c/34c | 27.0 | 0 |
| 36d/34d | 26.5 | 0 |

The process is repeated so that each of the batteries 34a, 34b, 34c and 34d is periodically supplying current to the load 14. This will result in some consumption of the capacities of the batteries 34b, 34c and 34d, even if they are not needed to supply the load. However, by keeping relatively brief the time periods during which the batteries 34b, 34c and 34d are switched to primary, e.g., three minutes in the above-example, the batteries 34b, 34c and 34d may be continuously depassivated without significant sacrifice of amp-hour capacity. The time periods for the cycles are largely matters of design discretion. However, advantageously the periods should be selected so that a given battery 34b, 34c and 34d supplies load long enough to depassivate its respective internal electrode.

It should be appreciated that the use of power in the batteries 34b, 34c and 34d that are initially regulated with lower voltages has been optimized. If the power held in reserve in those batteries 34b, 34c and 34d is not actually used in a discrete period of power supply (such as a discrete downhole job), those batteries 34b, 34c and 34d are much more likely to be available for future re-use. The selective depletion of batteries 34a, 34b, 34c and 34d as described above enables battery life to be maximized in selected batteries, rather than depleted in substantially all batteries.

It will be further appreciated that the configuration described above with respect to FIG. 3 is by way of example only. Other embodiments (not illustrated) might deploy fewer regulators 36a, 36b, 36c and 36d than batteries 34a, 34b, 34c and 34d. In such embodiments, the no-load output voltage levels preselected for regulators might be different, depending on anticipated current loads and expected drain on batteries over the course of a period of power supply.

Figure 4:
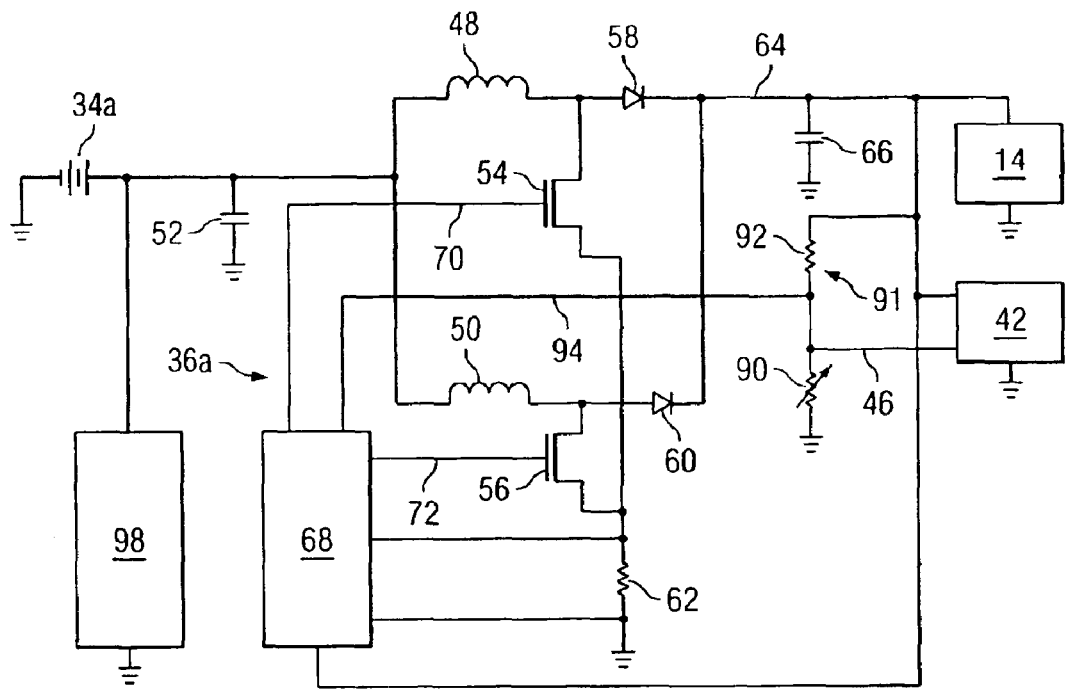
FIG. 4 is a schematic view of an exemplary embodiment of a regulator suitable for use in an exemplary multiple-battery power unit in accordance with the present invention.

The detailed structure and function of an exemplary embodiment of the regulator 36a depicted in FIG. 3 may be understood by referring to FIG. 4. The structure and function of the regulator 36a to be described will be illustrative of the other regulators 36b, 36c and 36d. The output of the battery 34a is connected in parallel to two inductors 48 and 50. One or more capacitors 52 are connected in parallel between the inductors 48 and 50 and the battery 34a. The function of the capacitor(s) 52 is to provide power during peak transience through the inductors 48 and 50 so that the transients are not transferred backward through the wiring to the battery 34a. The outputs of the inductors 48 and 50 are coupled to the respective sources of field effect transistors ("FET's) 54 and 56 and in series to the inputs of respective diodes 58 and 60. Note that the diodes 58 and 60 are represented schematically as a single diode 38a in FIG. 3. The drains of the respective field effect transistors 54 and 56 are connected to ground through a resistor 62 as shown. The function of the resistor 62 will be described in more detail below. The field effect transistors 54 and 56 function as switches that are cycled on and off in order to permit the cyclic charging and discharging of the inductors 48 and 50. The skilled artisan will appreciate that the switches or transistors 54 and 56 may be implemented as field effect transistors, bi-polar transistors, or virtually any other type of high speed switching device. The outputs of the diodes 58 and 60 are commonly tied to a conductor 64 that is connected to the load 14. An output filter capacitor 66 is interposed between the outputs of the diodes 58 and 60 and the input of the load 14. As with the input capacitor 52, the output capacitor 66 may be configured as a single capacitor or an array of capacitors.

A regulator circuit 68 is provided to perform a variety of functions for the regulator circuit 36a. The two primary functions of the regulator circuit 68 are to regulate the voltage output from the battery 34a and to limit the current drawn from the battery 34A to some preselected limit. The respective gates of the FET's 54 and 56 are coupled to the regulator circuit 68 by conductors 70 and 72.

Figure 5:
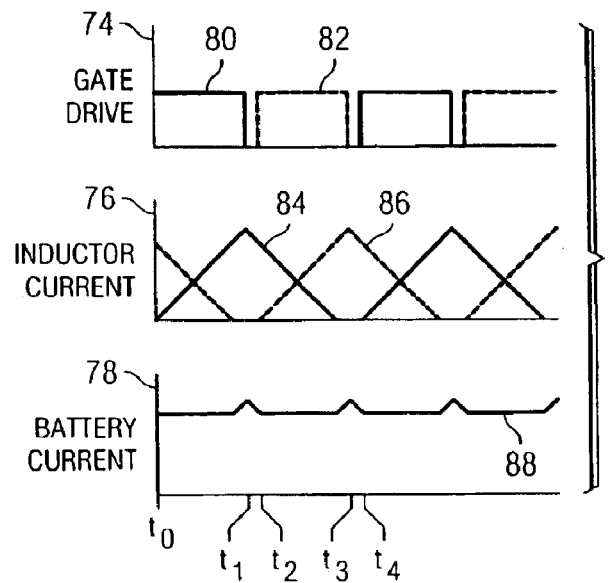
FIG. 5 is a timing diagram depicting operation of the regulator depicted in FIG. 4 in accordance with the present invention.

The operation of the regulator circuit 68 in conjunction with the FET's 54 and 56 and the inductors 48 and 50 may be understood by referring now also to FIG. 5, which is a timing diagram showing, as functions of time, a plot 74 of transistor gate current, a plot 76 of inductor current and a plot 78 of battery current. In plot 74, the solid trace 80 represents the gate drive current for the FET 54 and the dashed trace represents the gate current for the FET 56. In the plot 76, the solid trace 84 represents the inductor current for the inductor 48 and the dashed trace 86 represents the inductor current for the inductor 50. In the plot 78, the trace 88 represents the current delivered to the conductor 64 from the battery 34a. The trace 88 is an arithmetic sum of the traces 84 and 86 in the plot 76. At time $t_0$, the gate current for the FET 54 swings high as shown in the trace 80, the gate current for the FET 56 swings low and the output of the inductor 50 is tied to ground. During this time period, the inductor 48 begins charging up to some level. At time $t_1$, the gate of FET 54 swings low and the FET 54 is turned off. At this point, the inductor 48 collapses and the voltage at the input of the diode 58 rises until the diode 58 conducts at which point current flows to the conductor 64. At time $t_2$, the gate of the FET 56 swings high and the inductor 50 begins charging. Note that there is a small time lapse between the turning off of the FET 54 and the turning on of the FET 56 represented by the time period $t_2$–$t_1$. This gap eases the operation of the regulator circuit 68. However, the gap $t_2$–$t_1$ is optional in that the transistors 54 and 56 may turn on and off at the same time if desired. During the period $t_2$ to $t_3$, the inductor 50 continues to charge. At time $t_3$, the gate of the transistor 56 swings low and the field of the inductor 50 collapses. At this point, the voltage at the input of the diode 60 builds until the diode 60 conducts and delivers current to the conductor 64. The regulator waits to turn on the transistor 54 until time $t_4$, with the time lag $t_4$–$t_3$ being the same as the time lag $t_2$–$t_1$.

The outcome of this cyclic switching of the charging of the inductors 48 and 50 produces a relatively steady battery current represented by the trace 88. The use of two inductors 48 and 50 provides for a higher average power output from the battery 34a for the same peak current level. The regulator circuit 68 limits the peak current drawn from the battery 34a and will shut off the FET's 54 and 56 if the peak current detected exceeds the preselected limit. The current sensing is performed by sensing the current through the sense resistor 62.

The regulator circuit 68 controls the no-load output voltage, that is, the voltage supplied to the conductor 64 by controlling the on-times for the FET's 54 and 56. Longer on-time for the FET's 54 and 56 translate into higher no-load output voltages and vice versa. The initial no-load output voltage value is supplied to the regulator circuit 68 by the controller 42 and output of the controller 42 is connected to a potentiometer 90 that forms one-half of a voltage divider 91 along with a resistor 92. Communication between the controller 42 and the potentiometer 90 is via the communication channel 46 (previously shown in FIG. 3). A conductor 94 links the regulator circuit 68 and the voltage divider 91. At some point during a no-load condition, such as at device start-up or at some other point when there is a no-load condition, the controller 42 sets the no-load output voltage setting for the regulator circuit 68 by adjusting the potentiometer 90. After the initial setting of the no-load output voltage by the controller 42, the regulator circuit 68 continuously monitors the output of the voltage divider 91 and compares that output with an internally generated reference voltage. If the output of the voltage divider 91 varies from the internally generated reference voltage, then the regulator circuit 68 adjusts the on-times of the FET's 54 and 56 as necessary in order to maintain the regulated no-load output voltage in accordance with the initial set point.

If a decision is made to change the no-load output voltage of the regulator 36a, then the controller 42 changes the setting of the potentiometer 90, preferably during a no-load condition, so that the regulator circuit 68 thereafter adjusts the on-time of the FET's 54 and 56 to implement the new no-load output voltage setting. Such a change might occur where one of the batteries 34a, 34b, 34c or 34d becomes depleted and the no-load voltage set points of the remaining batteries are stair-stepped accordingly as described above.

If desired, a depassivation circuit 98 may be connected in parallel to the output of the battery 34a in order to provide a depassivation of the battery 34a during initial power up. The depassivation circuit will monitor the output voltage of the battery 34a and shut off when the output voltage swings up to a level indicating appropriate depassivation of the internal electrode thereof.

The regulator circuit 68 is advantageously a polyphase, push-pull step-up regulator. In an exemplary embodiment, a Unitrode model UCC3806 regulator may be used. The regulator described above is configured as a dual phase regulator. However, the skilled artisan will appreciate that more than two phases and inductors may be implemented as desired.

Figure 6:
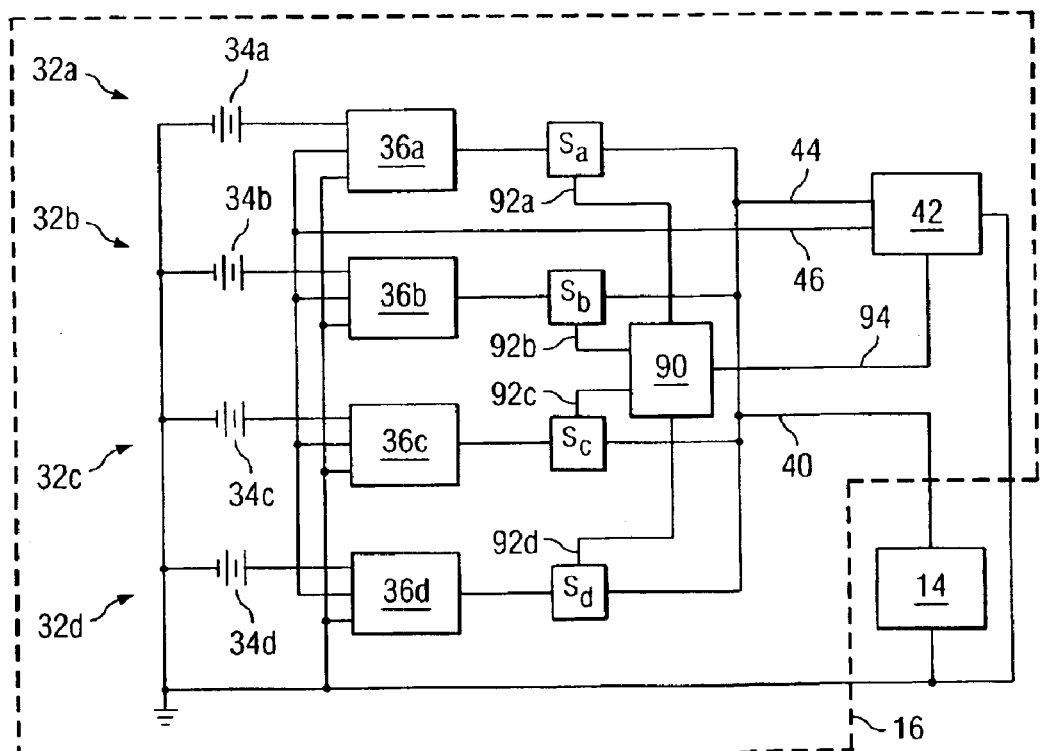
FIG. 6 is a schematic an alternate exemplary embodiment of a multiple-battery power unit in accordance with the present invention.

In the foregoing illustrative embodiments, the controllable regulators 36a, 36b, 36c and 36d work in concert with diodes 38a, 38b, 38c and 38d to provide preferential battery discharge. However, other switching may be implemented. An alternate exemplary embodiment of such an arrangement is illustrated in FIG. 6, which is a schematic view of the power unit 16 and the electrical unit or load 14. Like the other embodiments described elsewhere herein, the four battery circuits 32a, 32b, 32c and 32d are provided to power the electrical unit 14. The battery circuits 32a, 32b, 32c and 32d include respective batteries 34a, 34b, 34c, and 34d, and regulators 36a, 36b, 36c and 36d. However, the selective connection of the outputs of the regulators 36a, 36b, 36c and 36d to the load 14 is provided by switches $S_a$, $S_b$, $S_c$ and $S_d$. The switches $S_a$, $S_b$, $S_c$ and $S_d$ may be implemented as field effect transistors, bi-polar transistors or virtually any other type of high speed switch. The outputs of the switches $S_a$, $S_b$, $S_c$ and $S_d$ are tied in parallel to the load or electrical unit 14 via the conductor 40 and to the controller 42 via the conductor 44. Two-way communication between the controller 42 and the regulators 36a, 36b, 36c and 36d is provided by a communications channel 46, which may be a conductor bus or other type communications channel.

The on-off state of each of the switches $S_a$, $S_b$, $S_c$ and $S_d$ is determined by switching control logic 90. Channels 92a, 92b, 92c and 92d are provided between corresponding switches $S_a$, $S_b$, $S_c$ and $S_d$ and the control logic 90. The channels 92a, 92b, 92c and 92d convey control signals from the control logic 90 to the switches $S_a$, $S_b$, $S_c$ and $S_d$ and voltage and/or current sense signals from the outputs of the regulators 36a, 36b, 36c and 36d to the control logic 90. In this way, the control logic 90 may turn on a set of switches, such as $S_a$ and $S_b$, in order to satisfy a demand from the load 14 while preferentially discharging the batteries 34a, 34b, 34c and 34d. For example, the no-load output voltages of the regulators 36a, 36b, 36c and 36d maybe set as described elsewhere herein. If the load 14 is demanding current, the control logic 90 can turn on switch $S_a$ and monitor the output voltage of the regulator 36a via the channel 92a. If the output voltage of the regulator 36a falls to the voltage set point of the regulator 36b, indicating a need for more current, then the control logic 90 can turn on the switch $S_b$ and leave switch $S_a$ on, and so on for the remaining regulators 36c and 36d and switches $S_c$ and $S_d$. A communications channel 94 between the control logic and the controller 42 is provided so that the controller 42 can instruct the control logic 90 to cycle the switches appropriately so that the load 14 may draw power from each of the batteries 34a, 34b, 34c and 34d periodically, even if the power demand of the load 14 does not warrant switching.

Although the present invention and its advantages have been described in detail, it should be understood that various changes, substitutions and alternations can be made herein without departing from the spirit and scope of the invention as defined by the appended claims.

We claim:

1. A device for powering a load, comprising:
a first battery;
a second battery;
a first controllable regulator having an input coupled to the first battery and an output for coupling to the load;
a second controllable regulator having an input coupled to the second battery and an output for coupling to the load in parallel with the output of the first controllable regulator, the second controllable regulator being operable to enable the load to draw power from the second battery when an output voltage of the first regulator falls below a voltage setpoint; and
the first and second controllable regulators being operable to enable the load to alternately draw power from either of the first and second batteries even if the output voltage of the first controllable regulator does not fall below the voltage set point;
wherein the first and second batteries are periodically depassivated.

2. The device of claim 1, wherein the first battery has a first predetermined maximum design current and the second battery has a second predetermined maximum design current, the first and second controllable regulators being operable to selectively limit current from the first battery and the second battery respectively to the first and second maximum design currents.

3. The device of claim 1, wherein the first controllable regulator comprises a first inductor and a second inductor coupled to an output of the first battery, a first regulator circuit coupled to the first and second inductors, a first diode coupled to the first inductor and a second diode coupled to the second inductor, the regulator circuit being operable to selectively enable the first and second inductors to alternately energize for periods sufficient to cause the first and second diodes to conduct current from the first battery to the load.

4. The device of claim 3, further comprising a first switch coupled to the first inductor and the regulator circuit and a second switch coupled to the second inductor and the regulator circuit, the regulator circuit being operable to turn the switches on and off to selectively enable the first and second inductors to alternately energize for periods sufficient to cause the first and second diodes to conduct current from the first battery to the load.

5. The device of claim 3, wherein the second controllable regulator comprises a third inductor and a fourth inductor coupled to an output of the second battery, a second regulator circuit coupled to the third and fourth inductors, a third diode coupled to the third inductor and a fourth diode coupled to the fourth inductor, the second regulator circuit being operable to selectively enable the third and fourth inductors to alternately energize for periods sufficient to cause the third and fourth diodes to conduct current from the second battery to the load.

6. The device of claim 1, comprising a controller operable to set a no-load output voltage of each of the first and second controllable regulators, the voltage setpoint comprising the no-load output voltage of the second controllable regulator.

7. The device of claim 1, wherein the first and second controllable regulators comprise boost regulators.

8. A downhole tool, comprising:
an electrical unit requiring electrical power; and
power unit for supplying electrical power to the electrical unit, the power unit having a first battery, a second battery, a first controllable regulator having an input coupled to the first battery and an output coupled to the electrical unit, and a second controllable regulator having an input coupled to the first battery and an output coupled to the electrical unit in parallel with the output of the first controllable regulator, the second controllable regulator being operable to enable the electrical unit to draw power from the second battery when an output voltage of the first controllable regulator falls below a voltage setpoint.

9. The downhole tool of claim 8, wherein the first and second controllable regulators are operable, even if the output voltage of the first controllable regulator does not fall below the voltage setpoint, to enable the electrical unit to alternately draw power from either of the first and second batteries in order to depassivate the first battery and the second battery.

10. The downhole tool of claim 8, wherein the electrical unit compnses a sensor.

11. The dowuhole tool of claim 10, wherein the sensor is operable to sense a condition of a subterranean formation.

12. The downhole tool of claim 11, wherein the condition comprises resistivity.

13. The downhole tool of claim 8, wherein the first and second batteries are positioned in a first housing and the first and second regulators are positioned in a second housing, the first and second housings being disconnectable.

14. The downhole tool of claim 8, wherein the first battery has a first predetermined maximum design current and the second battery has a second predetermined maximum design current, the first and second controllable regulators being operable to selectively limit current from the first battery and the second battery respectively to the first and second maximum design currents.

15. The downhole tool of claim 8, wherein the first controllable regulator comprises a first inductor and a second inductor coupled to an output of the first battery, a first regulator circuit coupled to the first and second inductors, a first diode coupled to the first inductor and a second diode coupled to the second inductor, the regulator circuit being operable to selectively enable the first and second inductors to alternately energize for periods sufficient to cause the first and second diodes to conduct current from the first battery to the load.

16. The downhole tool of claim 15, further comprising a first switch coupled to the first inductor and the regulator circuit and a second switch coupled to the second inductor and the regulator circuit, the regulator circuit being operable to turn the switches on and off to selectively enable the first and second inductors to alternately energize for periods sufficient to cause the first and second diodes to conduct current from the first battery to the load.

17. The downhole tool of claim 15, wherein the second controllable regulator comprises a third inductor and a fourth inductor coupled to an output of the second battery, a second regulator circuit coupled to the third and fourth inductors, a third diode coupled to the third inductor and a fourth diode coupled to the fourth inductor, the second regulator circuit being operable to selectively enable the third and fourth inductors to alternately energize for periods sufficient to cause the third and fourth diodes to conduct current from the second battery to the load.

18. The downhole tool of claim 8, comprisin a controller operable to set a no-load output voltage of each of the first and second controllable regulators, the voltage setpoint comprising the no-load output voltage of the first controllable regulator.

19. The dowuhole tool of claim 8, wherein the first and second controllable regulators comprise boost regulators.

20. The downhole tool of claim 8, wherein the voltage set point comprises a no-load output voltage of the second controllable regulator.

21. A device for powering a load, comprising:

a first battery;

a second battery;

a first controllable regulator having an input coupled to the first battery and an output;

a first switch coupled to the output of the first controllable regulator for selectively coupling the first controllable regulator to the load;

a second controllable regulator having an input coupled to the second battery and an output;

second switch coupled to the output of the second controllable regulator for selectively coupling the output of the second controllable regulator to the load in parallel with the first controllable regulator, the first and second controllable regulators being operable to selectively operate the first and second switches to enable the load to draw power from the second battery when an output voltage of the first regulator falls below a voltage setpoint; and the first and second switches being operable to enable the load to alternately draw power from either of the first and second batteries even if the output voltage of the first controllable regulator does not fall below the voltage set point;

wherein the first and second batteries are periodically depassivated.

22. The device of claim 21, wherein the first and second switches comprise transistors.

23. The device of claim 22, wherein the transistors comprise field effect transistors.

* * * * *